(12) United States Patent
Stephen et al.

(10) Patent No.: US 8,051,768 B2
(45) Date of Patent: Nov. 8, 2011

(54) RETRACTABLE ROTISSERIE MOTOR

(75) Inventors: James C. Stephen, Arlington Heights, IL (US); Sonny Siazon, Woodstock, IL (US)

(73) Assignee: Weber-Stephen Products Co., Palatine, IL (US)

( * ) Notice: Subject to any disclaimer, the term of this patent is extended or adjusted under 35 U.S.C. 154(b) by 560 days.

(21) Appl. No.: 11/688,908

(22) Filed: Mar. 21, 2007

(65) Prior Publication Data

US 2008/0229937 A1 Sep. 25, 2008

(51) Int. Cl.
A47J 37/04 (2006.01)
A47J 37/07 (2006.01)

(52) U.S. Cl. .............. 99/421 H; 99/419; 99/421 M; 99/421 R

(58) Field of Classification Search .......... 99/421 H, 99/421 HH, 421 HV, 421 M, 421 R, 419; 248/200, 300
See application file for complete search history.

(56) References Cited

U.S. PATENT DOCUMENTS

| | | | |
|---|---|---|---|
| 3,257,937 A * | 6/1966 | Mell | 99/421 HV |
| 3,263,593 A | 8/1966 | Appleman | |
| 3,447,445 A * | 6/1969 | Koziol | 99/421 R |
| 4,469,019 A | 9/1984 | Baer | |
| 5,224,676 A | 7/1993 | Johnston | |
| 5,329,979 A * | 7/1994 | Miller et al. | 144/329 |
| 5,649,475 A | 7/1997 | Murphy | |
| 5,974,952 A | 11/1999 | Riccio | |
| 6,131,505 A | 10/2000 | Lin | |
| 6,405,640 B1 | 6/2002 | Moreth | |
| 6,810,793 B1 | 11/2004 | Hsu | |
| 6,851,820 B2 | 2/2005 | Choi et al. | |
| 6,935,327 B1 | 8/2005 | Williams et al. | |
| 7,008,072 B2 | 3/2006 | Witzel et al. | |
| 7,021,204 B2 | 4/2006 | Backus et al. | |
| 7,104,673 B2 | 9/2006 | Yu | |
| 7,331,617 B2 * | 2/2008 | Johnson | 292/202 |
| 2002/0108500 A1 | 8/2002 | Backus | |
| 2004/0084571 A1 * | 5/2004 | Liu | 248/37.3 |
| 2005/0092188 A1 | 5/2005 | Huegerich et al. | |
| 2006/0266228 A1 | 11/2006 | Ritterling | |
| 2008/0192369 A1 * | 8/2008 | Oehmann et al. | 359/841 |

* cited by examiner

*Primary Examiner* — Reginald L Alexander
(74) *Attorney, Agent, or Firm* — David I. Roche; Daniel A. Tallitsch; Baker & McKenzie LLP

(57) ABSTRACT

A retractable rotisserie driver which is used in connection with a barbecue grill is described and shown herein. In one embodiment, a retractable motor support apparatus is pivotably connected to a side shelf assembly of a barbecue grill, and is movable between a storage position, where the rotisserie motor is substantially enclosed by the side shelf assembly, and a usage position, where the motor is generally aligned for engagement with a rotisserie spit. The support apparatus includes a first wall and a second wall which are adjacent and generally transverse to one another. The first wall is configured to be aligned generally flush with an upper surface of the side shelf assembly when the support apparatus is moved to the storage position to increase the usable work area on the shelf. The second wall is provided with a power cord holder for compactly holding the motor's power cord when the apparatus is moved to the storage position. The side shelf assembly and support apparatus are also provided with corresponding latch mechanisms which are adapted to engage when the support apparatus is moved to the usage position.

37 Claims, 7 Drawing Sheets

RETRACTABLE ROTISSERIE MOTOR

TECHNICAL FIELD

The embodiments described and claimed herein relate generally to rotisseries for barbecue grills. More specifically, one embodiment relates to a rotisserie motor which is movably connected to a barbecue grill such that it can be moved to a storage position when not in use. Another embodiment relates to an electrically powered device which is movably connected to a barbecue grill such that it can be moved to a storage position when not in use.

BACKGROUND OF THE INVENTIONS

Rotisserie accessories for barbecue grills are well known in the art. Most incorporate rotisserie motors which are fixed to a side of the firebox of a barbecue grill, generally above a barbecue grill side table or shelf. Many manufacturers include pre-drilled holes and slots in the side of the firebox. The pre-drilled holes serve to accommodate a motor mounting bracket while the slots are configured to support the rotisserie spit above the heat source. The Weber® publication no. 96810, "Gas Barbecue Rotisserie Instructions," dated September 1998, provides an exemplary rotisserie accessory which is configured to be mounted in such a manner, and is incorporated herein by reference. This publication is currently available over the internet at www.weber.com.

The previously mentioned rotisserie configuration presents some problems. For example, since the mounting bracket is bolted to the side of the firebox, one can appreciate that it is difficult and/or inconvenient to remove the bracket from the firebox when the rotisserie is not being used. It is believed that most consumers do not put forth the effort to unbolt the accessory when using the grill in a conventional manner and instead leave the motor and/or the mounting bracket permanently in place. The motor and mounting bracket, therefore, unnecessarily block space on the barbecue grill side table, which would otherwise be usable if the motor and bracket were removed.

Other prior art rotisseries are disclosed in U.S. Patent Application Publication 2005/0092188, application Ser. No. 10/966,053 ("Huegerich") and U.S. Patent Application Publication 2006/0266228, application Ser. No. 11/388,617 ("Ritterling"). These prior art designs incorporate a rotisserie motor into the base of the grill, wherein the rotisserie motor is operably connected to the rotisserie spit by means of a chain or pulley system.

The rotisseries disclosed in these two application suffer from several problems. For example, since many of the rotisserie components are disposed within the base and the cooking chamber, valuable cooking surface area is lost. For this reason, it may be preferable to place the rotisserie driver outside of the cooking chamber to free up the cooking surface. This is true whether the rotisserie driver takes form as the motor itself (direct drive configuration) or some extension thereof (indirect drive configuration, where the motor is operably connected to the driver by means of chains, pulleys, or the like). Also, the rotisserie design disclosed by these references are quite complex; as such, it may be difficult to replace failed components. Moreover, the complex configuration is believed to be much more expensive to manufacture and more difficult to assemble than other prior art designs. Under certain circumstances, a direct drive configuration would be preferable since such a configuration uses fewer moving parts. Even further, the design of Ritterling's rotisserie may present some safety hazards. For example, because the rotisserie arms of Ritterling are disposed within the cooking chamber, they will most likely become extremely hot during use of the grill. It is possible that a consumer, who forgets to deploy the rotisserie arm before starting the grill or who decides the rotisserie is no longer needed, could burn himself if he attempted to grasp the arm's handle.

SUMMARY OF THE INVENTIONS

The various embodiments described herein provide a satisfactory means for overcoming at least some of the problems of the prior art. In one embodiment, a barbecue grill assembly is provided which comprises a cooking chamber and a support apparatus. The cooking chamber includes a heat source and a support which is configured to receive a rotisserie spit. The support apparatus is for supporting the rotisserie motor and is connected to the barbecue grill assembly in a manner which allows the rotisserie motor to move between a first position and a second position, wherein such movement occurs without disconnecting the rotisserie motor from the support apparatus. In the first position, the rotisserie motor is stored. In the second position, the rotisserie motor is positioned above a side shelf of the barbecue grill and the rotisserie motor is aligned for engagement with the rotisserie spit.

In another embodiment, a barbecue grill assembly is provided and comprises a cooking chamber and a connection. The cooking chamber has a heat source and is configured to receive a rotisserie spit. A portion of the rotisserie spit extends outside of the cooking chamber and is configured to engage with a rotisserie driver. The connection is adapted to connect the rotisserie driver to the barbecue grill and is configured to allow the rotisserie driver to move between a first position, where the rotisserie driver is stored, and a second position, where the rotisserie driver is positioned above a side shelf of the barbecue grill and is aligned for engagement with the rotisserie spit.

In yet another embodiment, a shelf assembly is provided for attachment to a barbecue grill. The shelf assembly includes a shelf and a rotisserie motor support structure. The shelf has an upper working surface. The rotisserie motor support structure is adapted to hold a rotisserie motor and is pivotably connected the shelf assembly, whereby the structure can be pivoted between a usage position and a storage position. When the structure is moved to the storage position, the rotisserie motor is positioned generally below the upper working surface. When the structure is moved to the usage position, the rotisserie motor is positioned above the upper working surface of the shelf.

In another embodiment, a barbecue grill assembly is provided. The barbecue grill assembly includes a cooking chamber, a side shelf and a support apparatus. The cooking chamber has a heat source and a support for a rotisserie spit, whereby a portion of the rotisserie spit extends outside of the cooking chamber past a side wall of the chamber. The portion of the rotisserie spit which extends outside of the cooking chamber is configured to engage with the rotisserie motor. The side shelf is positioned adjacent to the sidewall of the cooking chamber and has an upper wall and at least one side wall. The support apparatus is movably connected to the side shelf assembly for movement between a first position and a second position. In the first position, the rotisserie motor is stored and a first wall of the support apparatus is flush with either the upper wall or the side wall of the shelf. In the second position, the rotisserie motor is accessible for use. The rotisserie motor is movably connected to the support apparatus, whereby the motor can be moved between a retracted position and an extended position. The motor is aligned for engagement with the spit when placed in the extended position.

In yet another embodiment, a barbecue grill assembly is provided. The assembly includes a side table, a cooking chamber, and a support apparatus. The side table has an upper working surface and at least one sidewall. The cooking chamber has a heat source and is configured to receive a rotisserie spit. A portion of the rotisserie spit is configured for engagement with a rotisserie driver. The support apparatus supports the rotisserie driver and has a hinge which is configured to attaché the support apparatus to the side table. The hinge is positioned near an edge of the upper working surface, whereby the hinge allows the support apparatus to move between a first position and a second position. In the first position, the rotisserie driver is stored. In the second position, the rotisserie driver is positioned above a side shelf of the barbecue grill.

In another embodiment a barbecue grill assembly is provided. The assembly includes a cooking chamber and a support apparatus. The cooking chamber has a heat source. The support apparatus is configured to support an electrically powered device. The support apparatus is also movably connected to the barbecue grill assembly, whereby the apparatus is movable between a first position and a second position. In the first position, the device is stored. In the second position, the device is positioned above a side shelf of the barbecue grill.

BRIEF DESCRIPTION OF THE DRAWINGS

These and other features, aspects, objects, and advantages of the embodiments described and claimed herein will become better understood upon consideration of the following detailed description, appended claims, and accompanying drawings where:

Figure 1:
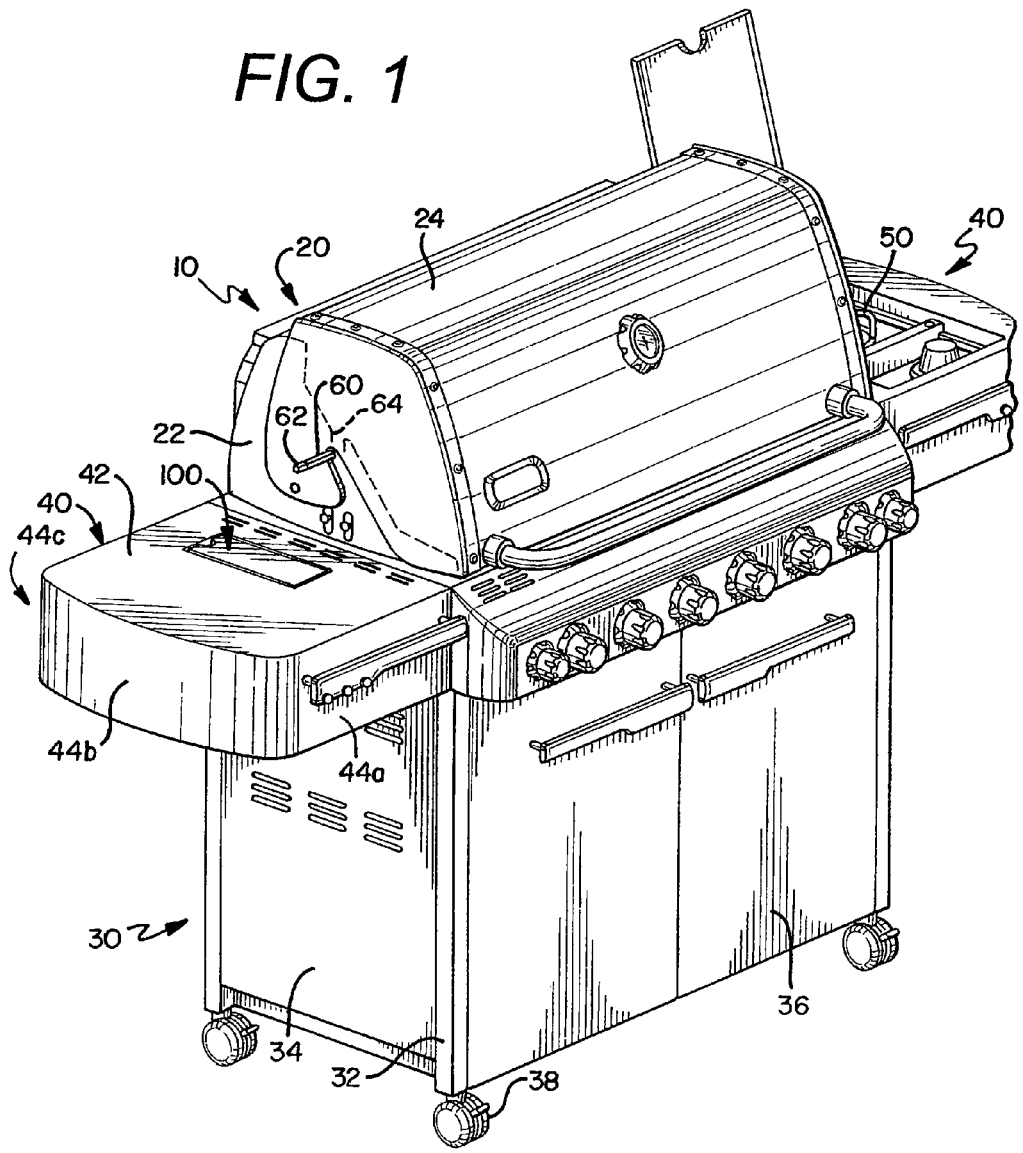
FIG. 1 is a perspective view of a barbecue grill which includes a first embodiment of the retractable rotisserie motor.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art of grill design may devise a number of alternative configurations that are similar and equivalent to the embodiments shown and described herein without departing from the spirit and scope of the claims.

Like reference numerals will be used to refer to like or similar parts from figure to figure in the following description of the drawings.

DETAILED DESCRIPTION OF THE DRAWINGS

Referring first to FIG. 1, an exemplary barbecue grill 10, which incorporates a first embodiment described and claimed herein, is depicted. The barbecue grill 10 depicted is a stand-alone, gas-fired grill; however, it is contemplated that devices of the types shown and described herein may be incorporated into other types of grills, such as charcoal grills, smokers, small portable grills, and built-in grills. The barbecue grill 10 of FIG. 1 comprises typical features such as a cooking chamber 20, a cart assembly 30, side shelves (or tables) 40, and a side burner 50.

The cooking chamber 20 is shown to include a fire bowl 22 and a lid 24 which is pivotably mounted to the fire bowl 22. However, it is contemplated that the lid 24 could be removable from the fire bowl 22. Alternatively, the cooking chamber 20 could comprise only the fire bowl 22. The cooking chamber 20 is configured to receive a rotisserie skewer or spit 60 therethrough and to allow the spit 60 to rotate about its longitudinal axis. In the embodiment shown in FIG. 1, the fire bowl 22 holds the elongated spit 60 near opposing ends of the spit with spit support slots 64 which are formed into the side walls of the fire bowl 22. A portion of the spit 62 extends past a side wall of the cooking chamber and includes a structure for engaging with a driver portion 154 of the rotisserie motor 150. Many alternative structures which are configured to support a rotisserie spit 60 are known in the art, and it is contemplated that such structures could replace the spit support slots 64 shown in FIG. 1. The cart assembly 30 is comprised of a plurality frame member 32, panels 34, doors 36, and casters 38. The barbecue grill 10 also includes two side shelves 40, one of which includes the side burner 50. Both of the shelves 40 include an upper working surface 42 and several downwardly depending side walls 44a, 44b, 44c. The upper working surface 42 together with the side walls 44a, 44b, 44c define an enclosure 46. The side shelves 40 may include a bottom wall (not shown), although the bottom of the shelf 40 as shown is open.

A rotisserie driver, such as a rotisserie motor 150, is movably connected to the barbecue grill 10 such that the driver can be moved between a usage position and a storage position. Although the shown embodiment contemplates that the motor 150 itself is the driver, and that the motor 150 is movable, it is contemplated that the motor 150 could be fixed relative to the grill 10. In such case the motor 150 would be operably connected through gears, pulleys, chains, and/or the like to the driver, wherein the driver would be movable relative to the grill 10.

In the usage position, the motor 150 is aligned with and can mate with the rotisserie spit 60 or an extension thereof. It is contemplated that the motor 150 could directly drive the rotisserie spit 60, as depicted herein, or could indirectly drive the spit 60 through gears or the like. In the storage position, the motor 150 is remotely located to improve the functionality of the barbecue grill 10. In one embodiment, the motor 150 is remotely located at the storage position to increase the usable working area of the side shelf or to otherwise increase the usability of the working area. For example, the storage position of the motor 150 could be near a rearward side of the shelf 40 or near the rear side wall 44c of the shelf 40. Alternatively, the motor could be suspended from the barbecue grill, perhaps from the side shelf 40, when moved to the storage position. In another embodiment, the storage position is an enclosed area which reduces wear and tear on the motor and protects the motor from the elements.

In the first embodiment shown in FIGS. 1-6, the rotisserie motor 150 is configured to retract into the enclosure 46 of the side shelf 40 through the upper working surface 42. However, it is contemplated that the motor 150 could retract through any other surface, including any of the side walls 44a, 44b, 44c. Moreover, the motor 150 could retract into any other portion of the barbecue grill, including the cooking chamber 20 or the cart assembly 30. Even further, the motor 150 need not retract "into" anything when placed in the storage position.

Figure 2:
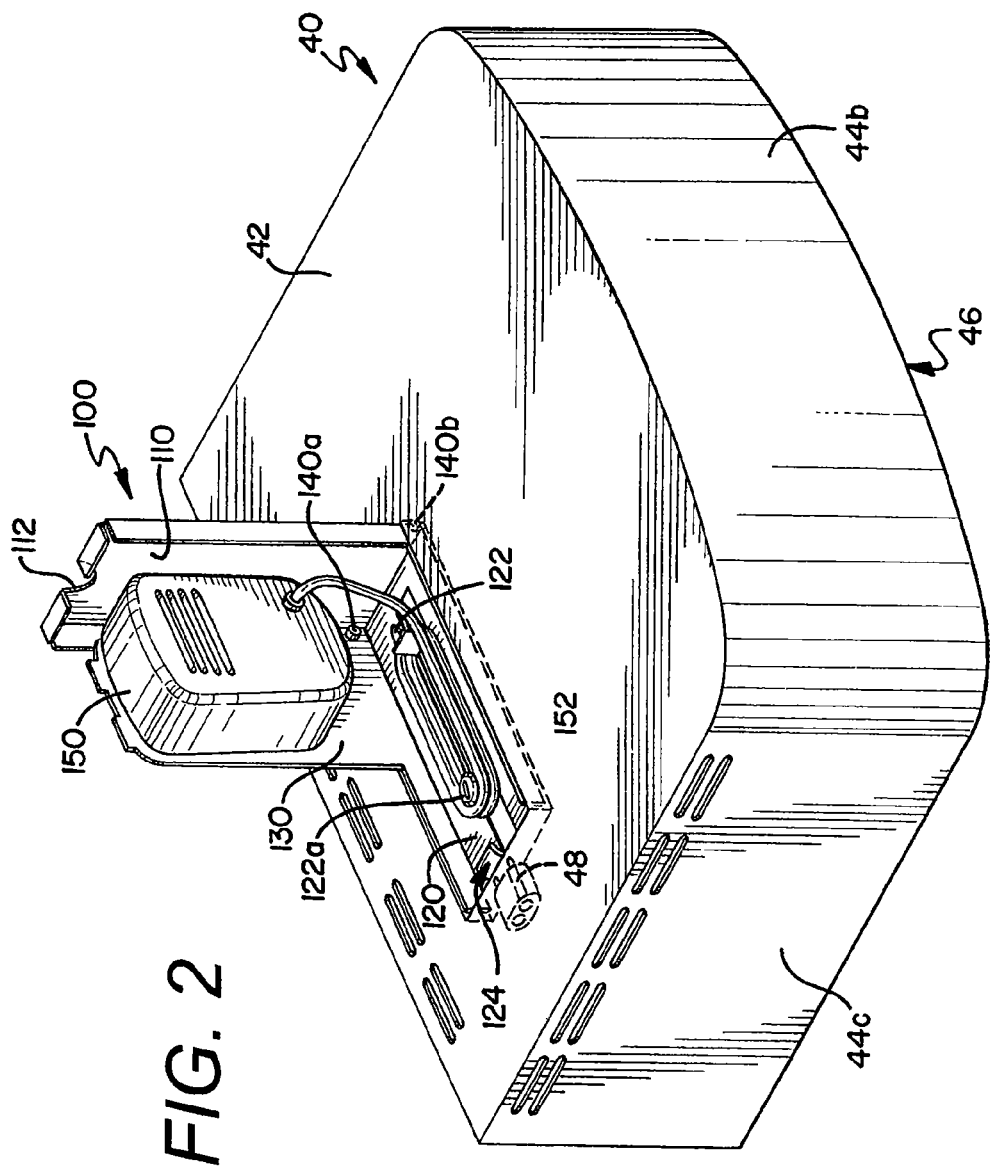
FIG. 2 is a perspective view of the barbecue grill's side shelf assembly (partially transparent) with the rotisserie motor removably secured in the usage position.

FIG. 2 shows one embodiment of a motor support structure 100 which permits the motor 150 to move between a usage position and a storage position. The motor support structure 100 includes a first wall 110, a second wall 120, a gusset 130, and a latch mechanism 124. The first wall 110 is connected to and aligned transverse to the second wall 120. The first wall 110 is provided with the finger hole 112, which allows a user to grip the structure 100 when the structure is placed in the storage position. The second wall 120 includes a power cord holder or organizer, which can be comprised of a cleat or opposing brackets 122a, 122b, for storing the rotisserie motor power cord 152. In another embodiment, the grill is provided with a power distribution system and internal wiring for powering the motor 150. In such an embodiment, the cord organizer would not be necessary. The gusset 130 connects and supports the first and second walls 110, 120 to provide rigidity and strength to the structure 100 and holds the motor 150. The motor 150 can be attached to the gusset 130 using any satisfactory means such as fasteners or snap-fit connections. As shown, however, the motor 150 includes a sleeve which engages with the outside edges of the gusset portion 130 (see the second embodiment of the motor 250 in FIG. 7 for a better view of the sleeve). Alternatively, the motor 150 can be attached to any other portion of the structure 100, such as the first wall 110 or the second wall 120. The gusset 130 includes an aperture (not shown) which permits the spit 60 to mate with the motor 150.

The latch mechanism 124 of the motor support structure 100 is adapted to engage with one or more corresponding locking member 48 which is mounted to the barbecue grill 10. The latch mechanism 124 is a spring-like tab which is mounted to the second wall 120 of the support structure 100. The latch mechanism 124 includes an aperture which is adapted to receive a pin from the locking member 48. The latch mechanism 124 is releasable by hand by pushing the tab away from the pin of the locking member 48. Although the latch mechanism 124 is shown to engage with only a single locking member 48 when the motor 150 is placed in the usage position, it is contemplated that the latch mechanism 124 can be mounted to any other portion of the structure 100 or motor 150 and could lock the motor 150 in one or both of the storage or usage positions. Moreover, many types of latches or locks are known in the art, besides the specific latch mechanism 124 and locking member 48 described and shown herein. It is well within the skill of a person of ordinary skill in the art to replace the specific latch mechanism 124 and locking member 48 described herein with other types of latches(s) or lock(s).

The motor support structure 100 is pivotably connected to the side shelf 40 along an axis defined by the connectors 140a, 140b. The pivot connectors 140a, 140b can be fasteners, bolts, pins, or any other structure which would allow the structure 100 to pivot. Although the figures show pivotably connected structures 100, it is contemplated that the rotisserie motors 150 or structures 100 could move in ways other than pivoting, such as sliding or telescoping. In such cases, the connector(s) 140a, 140b could take a different form, such as drawer slides or telescoping arms.

Figure 3:
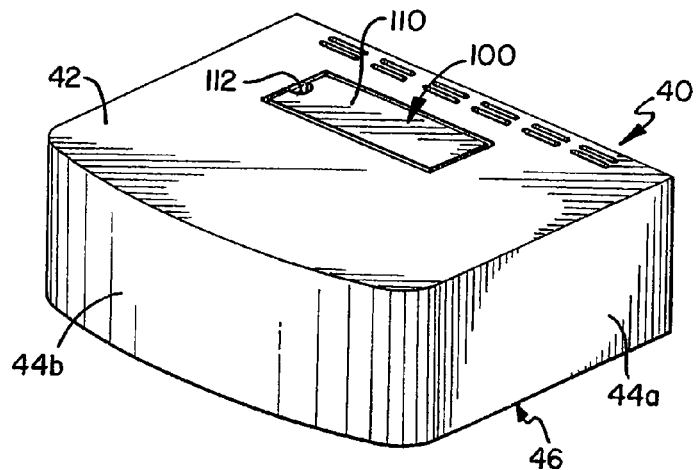
FIG. 3 is a perspective view of the barbecue grill's side shelf assembly with the rotisserie motor in the storage position.
Figure 4:
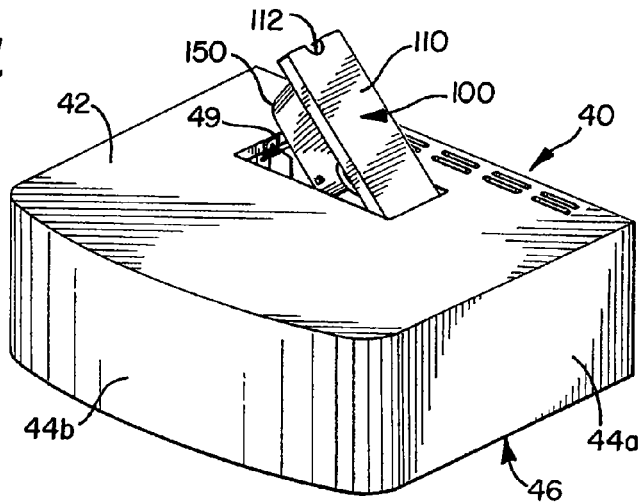
FIG. 4 is a perspective view of the barbecue grill's side shelf assembly with the rotisserie motor being moved from the storage position to the usage position.

FIGS. 3-6 demonstrate the operation of the grill with the first embodiment of the movable rotisserie motor. With reference first to FIG. 3, the motor 150 in shown in the storage position. In the storage position, the motor 150 is disposed within the enclosure 46 and is generally out of view. In this position, the motor 150 is generally protected from the elements and does not block usable work space on the side shelf 40. The only portion of the support structure 100 which is generally visible when the motor 150 is placed in the storage position is the first wall 110. In this position, the first wall 110 is aligned generally flush with the upper working surface 42 of the side shelf 40. As such, most if not all of the area of the upper surface 42 within the perimeter of the side shelf (within the side walls 44a, 44b, 44c) is usable work surface. As demonstrated by FIG. 4, the support structure 100 pivots to allow the motor 150 to move from the storage position to the usage position.

Figure 5:
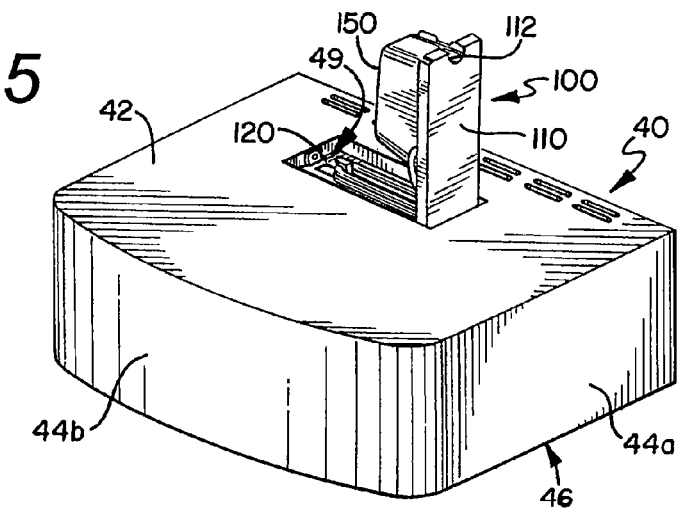
FIG. 5 is a perspective view of the barbecue grill's side shelf assembly with the rotisserie motor in the usage position.
Figure 6:
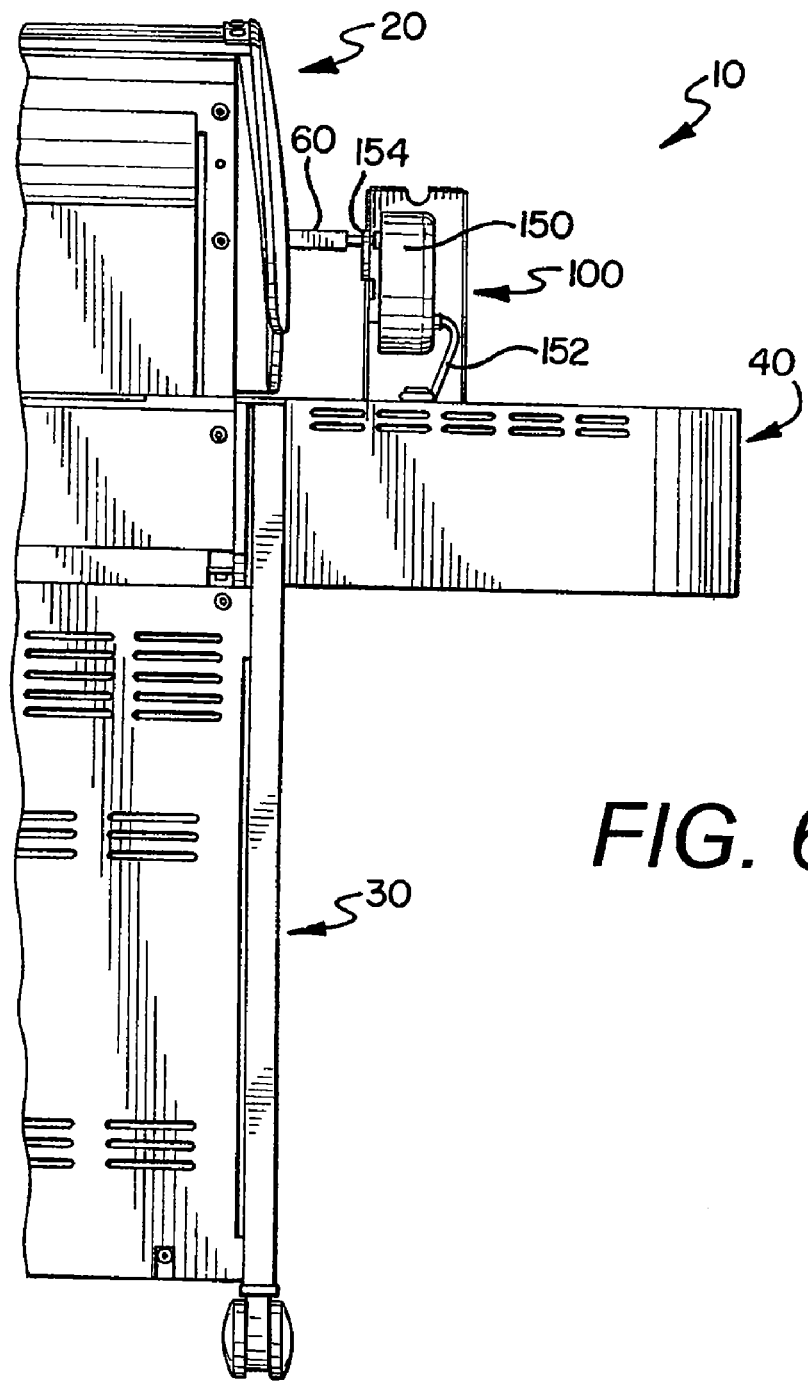
FIG. 6 is a partial rear view of the barbecue grill showing the rotisserie motor in the usage position and in engagement with a rotisserie spit.

With reference to FIGS. 5 and 6, the motor 150 is shown in the usage position. In the usage position, the motor 150 is locked into position by means of the latch mechanism 124 and locking member 48 and is generally aligned with the spit and can be connected thereto. As can be appreciated, some workspace on the side shelf 40 is "lost" when the motor 150 is placed in the usage position. With primary reference again to FIG. 2, the second wall 120 is accessible when the motor 150 is placed in the usage position. In this manner, the user can access the power cord 152 for the motor 150. In an alternative embodiment, the second wall 120 is configured to be generally flush with the upper working surface 42 when the motor 150 is place in the usage position. In this manner, some of the "lost" working space can be recovered.

The first embodiment shown and described in FIGS. 1-6 has a hinge at a front edge of the opening 49 in the working surface 42. In this embodiment, the motor will be facing in a rearward direction in the usage position and the latch mechanism 124 is at the rear of the opening 49. See FIG. 5. However, it may be advantageous to place the hinge on the rear edge of the opening 49 and to locate the latching mechanism 124 at the front or side edge of the opening 49, particularly if one were to design a positive locking mechanism, such as one that would require hand operation to engage and release the locking member 48. In this case, the motor 150 would be facing forward in the usage position.

Figure 7:
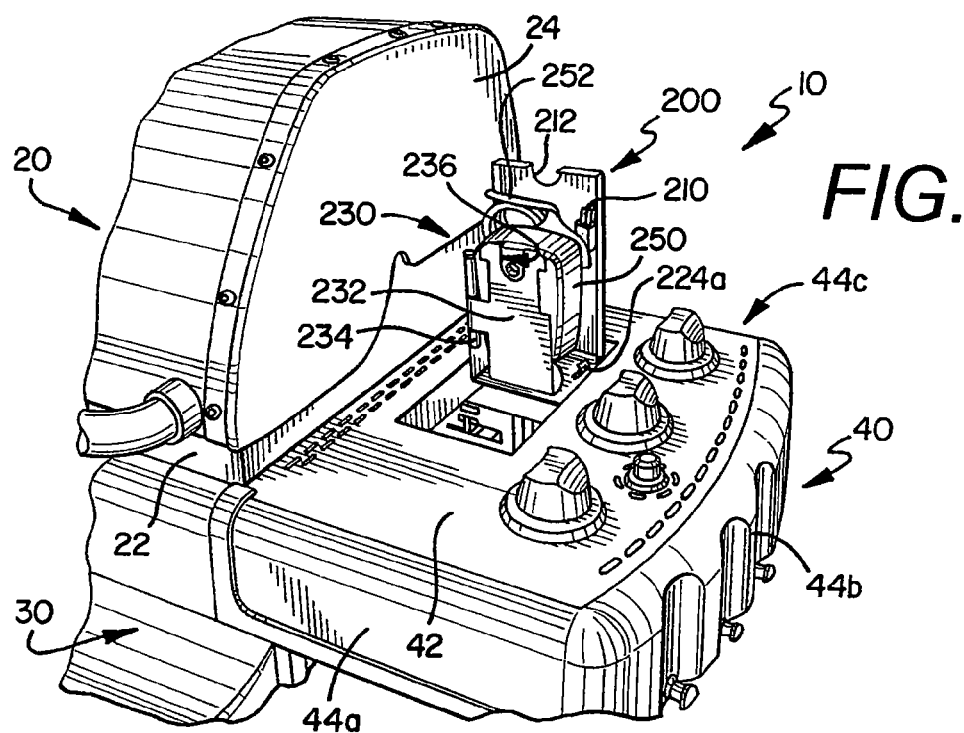
FIG. 7 is a perspective view of a barbecue grill which includes a second embodiment of the retractable rotisserie motor, with the motor support structure in an extended position and the rotisserie motor in a retracted position.
Figure 8:
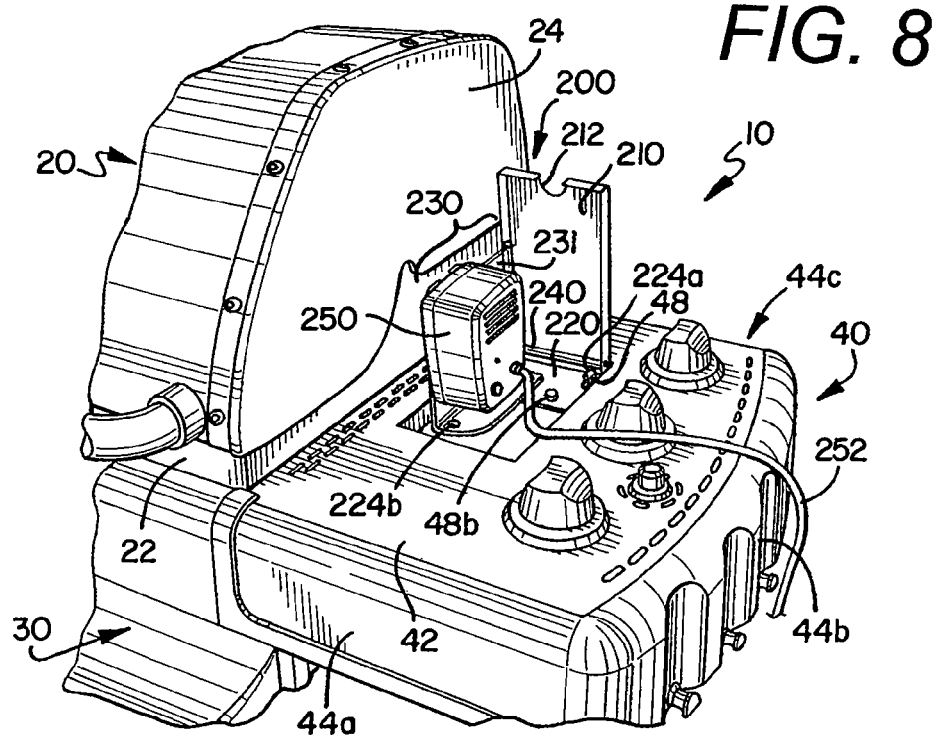
FIG. 8 is a perspective view of the second embodiment with the motor support structure in an extended position and the rotisserie motor in the usage position.
Figure 9:
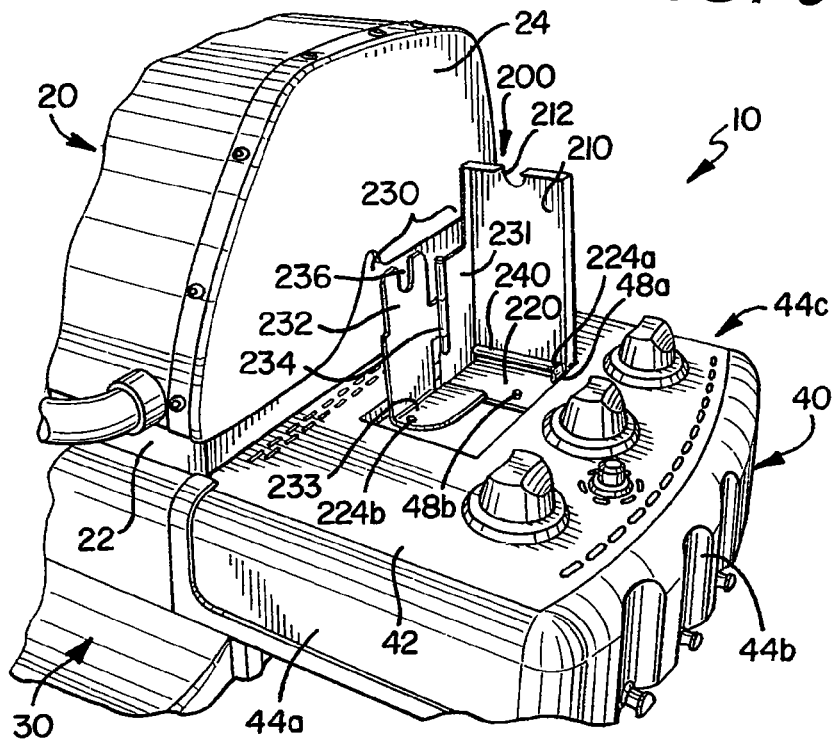
FIG. 9 is a perspective view of the second embodiment with the motor removed.

For example, a second embodiment of the retractable motor 250 is shown in FIGS. 7-9. The second embodiment includes a motor support structure 200 which is hingedly connected to the side shelf 40, the hinged connection being disposed at a rear side of the opening 49 in the upper working surface 42 of the shelf 40. The motor support structure 200 is pivotably connected to the side shelf 40 along an axis defined by the hinge 240. The hinge 250 can be fasteners, bolts, pins, or any other structure which would allow the structure 200 to pivot. The hinged connection allows the motor support structure to move from a first (or storage) position, where the rotisserie motor 250 is housed within the side shelf 40 to a second (or extended) position, where the rotisserie motor 250 is positioned above the side shelf. The motor support structure 200 includes a first wall 210, a second wall 220, a third wall 230, and a latch mechanism 224a. The first wall 210 is connected to and aligned transverse to the second wall 220. The first wall 210 is provided with the finger hole 212, which allows a user to grip the structure 200 when the structure is placed in the storage position. The second wall 220 serves to interconnect and support the first and third walls 210, 230. Although the second wall 220 of the second embodiment is significantly shorter than the second wall 120 of the first embodiment, it is contemplated that the second wall 220 of the second embodiment could include similar structure as the second wall 120 of the first embodiment. Indeed, the second wall 20 could include a power cord holder or organizer for storing the power cord 252, such as a cleat 122a, 122b like the first embodiment.

The third wall 230 is connected and aligned transverse to both the first and second walls 210, 220 and is configured to hold the motor 150. The third wall 230 is configured to be collapsible, such that the motor 250 can be moved between a first (or retracted) position and a second (or usage position), where the motor is generally aligned with a rotisserie spit 60. In the embodiment shown in FIGS. 7-9, the third wall 230 includes a first panel 231 which is connected to a second panel 232 by a hinge 234, whereby the second panel 232 can be folded inwardly and outwardly between the retracted position and the usage position, respectively. It is contemplated that the third wall can be configured to collapse using other equivalent structures, such as drawer slides or telescoping members. The third wall 230 also includes a third panel 233 which is connected to and aligned transverse to the second panel 232. The third panel 233 is aligned generally parallel to the second wall 220, and is positioned generally above the second wall 220 when the third wall is placed in the collapsed position. The third panel 233 includes an aperture 224b which is adapted to lockingly mate with the pin of a locking member 48b which is disposed on the second wall, whereby the motor 250 can be locked in the storage position. The third panel 233 is releasable by hand by pushing on the pin of the locking member 48b.

The motor 250 is connected to the second panel 232 by means of opposing sleeve members 256, 258, which are configured to slidingly engage opposing edges of the second panel 232. However, it is contemplated that the motor 250 can be attached to the third wall 230 using any satisfactory means such as fasteners or snap-fit connections. The second panel includes a slot or aperture 236 which exposes the driver portion 254 of the motor 250, whereby the driver portion 254 can mate with the rotisserie spit 60.

The latch mechanism 224a of the motor support structure 200 is adapted to engage with one or more corresponding locking member 48a, which is mounted to the barbecue grill 10. In the second embodiment, the locking member 48a is mounted to a side of the opening 49 in the side shelf 40, although it is contemplated that the locking member 48a could be mounted to the front of the opening 49. The latch mechanism 224a is a spring-like tab which is mounted to the second wall 220 of the support structure 200. The latch mechanism 224a includes an aperture which is adapted to receive a pin from the locking member 48a. The latch mechanism 224a is releasable by hand by pushing the tab away from the pin of the locking member 48. Although the latch mechanism 224a is shown to engage with only a single locking member 48a when the support structure 200 is placed in the second position, it is contemplated that the latch mechanism 224a can be mounted to any other portion of the structure 200 or motor 250 and could lock the support structure 200 in one or both of the first or second positions. Moreover, many types of latches or locks are known in the art, besides the specific latch mechanism 224a and locking member 48a described and shown herein. It is well within the skill of a person of ordinary skill in the art to replace the specific latch mechanism 224a and locking member 48a described herein with other types of latches(s) or lock(s).

Although not specifically shown, the second embodiment of the support structure 200 is adapted to pivot in a similar manner as the first embodiment of the support structure 100. For example, in the first position, the motor 250 is disposed within the enclosure 46 and is generally out of view. In this position, the motor 250 is generally protected from the elements and does not block usable work space on the side shelf 40. The only portion of the support structure 200 which is generally visible when the motor 250 is placed in the first position is the first wall 210. In this position, the first wall 210 is aligned generally flush with the upper working surface 42 of the side shelf 40. As such, most if not all of the area of the upper surface 42 within the perimeter of the side shelf (within the side walls 44a, 44b, 44c) is usable work surface. In the second position, the support structure 200 is locked into position by means of the latch mechanism 224a and locking member 48b. At this point the motor 250 can be swung outwardly into the usage position, where it is generally aligned with the spit and can be connected thereto. As can be appreciated, some workspace on the side shelf 40 is "lost" when the support structure is placed in the second position and the motor 250 is placed in the usage position. However, the lost workspace is recovered when the motor 250 is retracted and the support structure 200 is pivoted into the side shelf 40 to the storage position.

Figure 10:
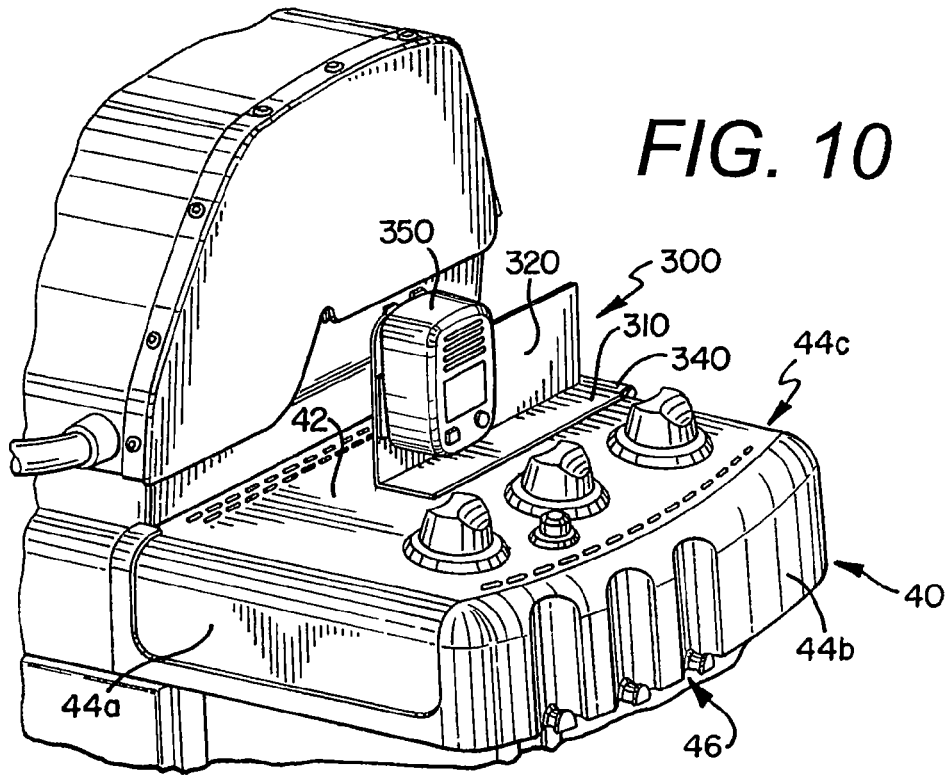
FIG. 10 is a perspective view of a barbecue grill which incorporates a third embodiment of a retractable rotisserie motor with the motor in the usage position.
Figure 11:
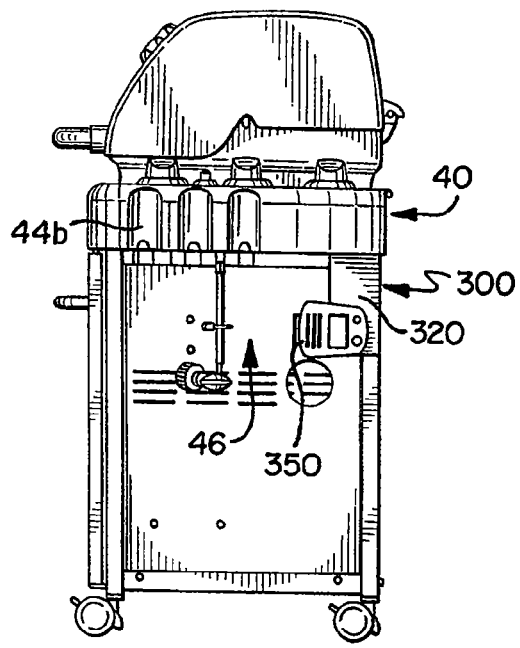
FIG. 11 is a side view of the same with the motor being moved between the usage and storage positions.
Figure 12:
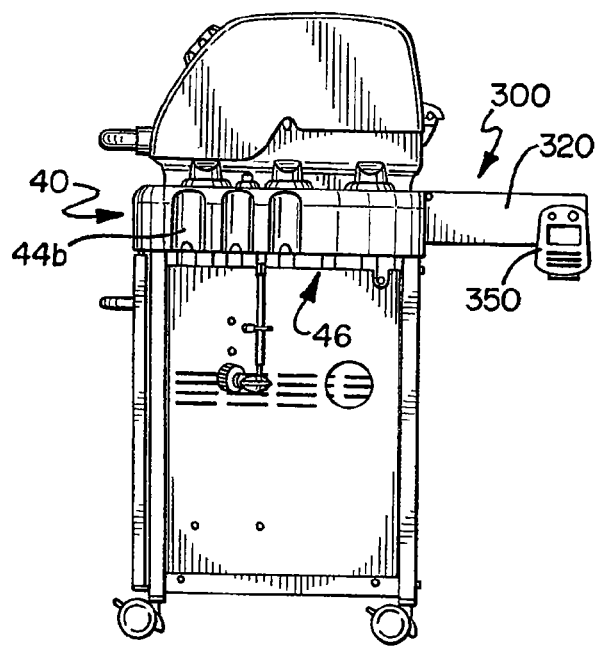
FIG. 12 is a side view of the same with the motor in the storage position; and, FIG. 13 is a front view of a barbecue grill which incorporates a fourth embodiment of a retractable light fixture with the light fixture in the usage position.

A third embodiment of a retractable motor 350 is shown in FIG. 10-12. The motor 350 is shown to flip out from behind the shelf into a usage position, although it is contemplated that the motor 350 could flip out from the side or the front of the shelf. The third embodiment includes a motor support structure 300 which is hingedly connected to the side shelf 40, the hinged connection 340 being disposed near or at a rear edge of the shelf 40. The motor support structure 300 is pivotably connected to the side shelf 40 along an axis defined by the hinge 340. The hinge 340 can be fasteners, bolts, pins, or any other structure which would allow the structure 300 to pivot. The hinged connection allows the motor support structure to move from a storage position, where the rotisserie motor 350 is remotely located to a usage position, where the rotisserie motor 350 is positioned above the side shelf and is aligned for engagement with a rotisserie spit 60.

The motor support structure 300 includes a first wall 310 and a second wall 320. The first wall 310 is connected to and aligned transverse to the second wall 320. In the usage position, the first wall 310 is generally flush with the upper working surface 42 of the side shelf 40, whereby the first wall 310 rests flat on top of the upper working surface 42. In the storage position, the first wall 310 is generally flush with the rear side wall 44c of the side shelf, whereby the motor support structure 300 is at least partially housed within the enclosure 46 of the side shelf. In the storage position, the motor 350 is positioned below the shelf and is thereby at least partially protected from the elements. Although not shown, it is contemplated that the rear side wall 44c of the side shelf 40 is discontinuous, thereby allowing the structure 300 to move into the storage position (see FIG. 12).

Like the earlier described embodiments, the second wall 320 could include a power cord holder or organizer for storing the motor's power cord, such as a cleat like the first embodiment. The motor 350 is connected to the second wall 320 by means of opposing sleeve members (not shown in detail), which are configured to slidingly engage opposing edges of the second panel. However, it is contemplated that the motor 350 can be attached to the second wall 320 (or any other wall) using any satisfactory means such as fasteners or snap-fit connections. The second wall 320 includes a slot or aperture (not shown) which exposes the driver portion (not shown) of the motor 350, whereby the driver portion can mate with the rotisserie spit 60.

Figure 13:
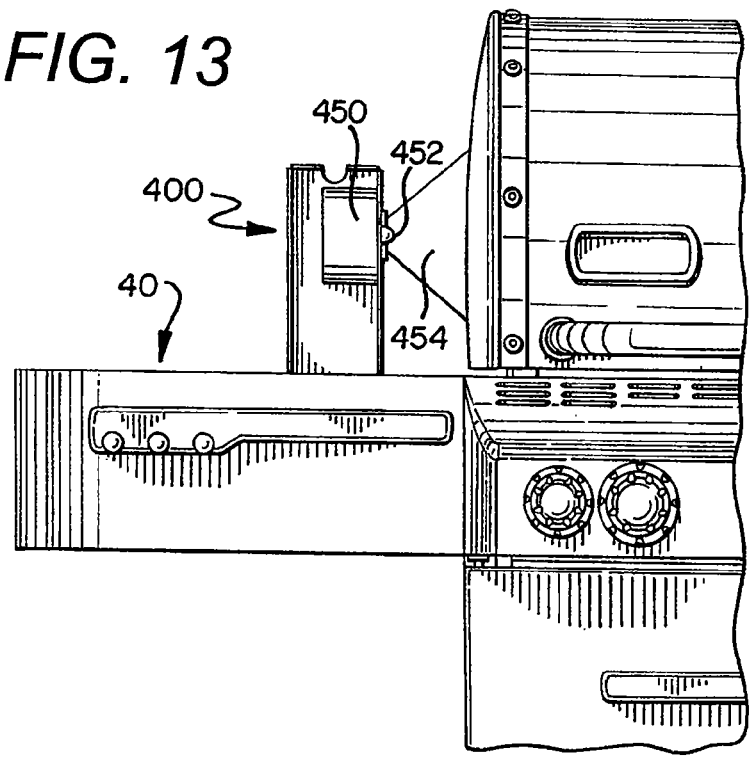

A fourth embodiment of a support structure 400 is shown in FIG. 13. The support structure 400 is configured to support a light fixture 450 and is movable between a storage position, where the light fixture 450 is remotely located, and a usage position, where the light fixture is positioned above a side shelf 40 of the barbecue grill. As shown, the light fixture 450 includes a light bulb or LED 452 which directs light 454 towards the cooking surface of the barbecue grill. It is contemplated that the support structure 400 could comprise similar structure like the first, second or third embodiment of the support structure 100, 200, 300, whereby the structure 400 would pivot between storage and usage positions. Alternatively, the structure 400 could be configured for linear movements between storage and usage positions, like the fifth embodiment described below.

While the embodiments are shown in the figures and described above as pivoting between the storage and usage positions, it is contemplated that the motor could linearly move between the storage and usage positions. One such alternative embodiment would comprise a pop-up motor support structure which is configured to move along a vertical axis through the top working surface of the side shelf. The structure could be electrically controlled to move between the storage and usage positions. For example, the structure could include rack and pinion gearing which is powered by an electrical motor. Alternatively, the structure could include mechanical means to bias the structure in the storage or usage position. For example, the structure could include a gas spring or a coiled spring which would force the structure towards the usage position. In such a case, the structure would include a lock to hold the structure in the storage position. When the lock is released, the structure would automatically move to the usage position. If the spring was configured to bias the structure towards the storage position, the structure would include a lock to lock the structure in the usage position. To use such a structure, the consumer would simply pull the structure to the usage position and engage the lock.

Although the shown embodiments includes a support structure 100, 200, 300 for supporting the motor 150, 250, 350 it is contemplated that the motor 150, 250, 350 could be directly attached to the barbecue grill. In some cases, it is contemplated that one of the sidewalls of the motor housing 150, 250, 350 could be aligned generally flush with the a surface 42 or wall 44 of the shelf 40 when the motor was placed in the storage position.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A barbecue grill assembly comprising:
   a cooking chamber having a heat source and a support being configured to receive a rotisserie spit;
   a support apparatus for supporting a rotisserie motor, the support apparatus being connected to the barbecue grill assembly;
   the support apparatus being configured to allow the rotisserie motor to move between a first position, where the rotisserie motor is stored, and a second position, where the rotisserie motor is positioned above a side shelf of the barbecue grill and the rotisserie motor is aligned for engagement with the rotisserie spit, without disconnecting the rotisserie motor from the support apparatus and without disconnecting the support apparatus from the barbecue grill assembly; and,
   wherein the support is movably connected to the side shelf.

2. The barbecue grill assembly of claim 1, wherein the motor is adapted to pivot from the first position to the second position.

3. The barbecue grill assembly of claim 1, wherein the support apparatus is configured for linear movement between the first and second positions.

4. The barbecue grill assembly of claim 1, wherein the barbecue grill assembly further comprises a releasable securing member for securing the motor in the second position.

5. The barbecue grill assembly of claim 1, wherein the support apparatus includes a first wall which is generally flush with a wall of the side shelf when the support apparatus is moved to the first position.

6. The barbecue grill assembly of claim 5, wherein the wall of the side shelf is an upper working surface.

7. The barbecue grill assembly of claim 5, wherein the wall of the side shelf is a rear side wall.

8. The barbecue grill assembly of claim 5, wherein the rotisserie motor includes a power cord and the support apparatus includes a second wall which is adjacent and generally transverse to the first wall, the second wall including a power cord holder for storing the rotisserie motor's power cord.

9. The barbecue grill assembly of claim 5, wherein the support apparatus further includes a second wall and a gusset, the second wall being adjacent and generally transverse to the first wall and the gusset providing structural integrity for the support apparatus and holding the rotisserie motor.

10. The barbecue grill assembly of claim 9, wherein the support apparatus is pivotably mounted to the side shelf, such that the first wall is generally aligned in a horizontal plane when the support apparatus is moved to the first position and is generally aligned in a vertical plane when the support apparatus is moved to the second position.

11. The barbecue grill assembly of claim 10, wherein the second wall is generally aligned in a vertical plane when the support apparatus is moved to the first position and is generally aligned in a horizontal plane when the support apparatus is moved to the second position.

12. The barbecue grill assembly of claim 1, wherein the side shelf comprises a upper wall and at least one side wall defining an enclosure, whereby the rotisserie motor is positioned within the enclosure when the support apparatus is moved to the first position.

13. The barbecue grill assembly of claim 12, wherein:
the rotisserie motor includes a power cord;
the support apparatus includes a first wall and a second wall, the second wall including a power cord holder for storing the rotisserie motor's power cord;
the first wall is generally flush with the upper wall of the side shelf and the power cord holder is positioned within the enclosure when the support apparatus is moved to the first position;
the power cord holder is accessible when the support apparatus is moved to the second position.

14. A barbecue grill assembly comprising:
a cooking chamber having a heat source and comprising a fire bowl and a lid, the fire bowl having opposing side walls which hold a rotisserie spit, wherein a portion of the rotisserie spit extends outside of the cooking chamber and is configured for engagement with a rotisserie driver;
at least one pivot connection connecting the rotisserie driver to the barbecue grill, whereby the rotisserie driver pivots between a first position, where the rotisserie driver is stored below a top surface of a side shelf of the barbecue grill, and a second position, where the rotisserie driver is positioned above the top surface of the side shelf, the rotisserie driver remaining connected to the barbecue grill via the pivot connection when moved between the first position and the second position; and,
in the second position, the rotisserie driver is aligned with and mates with the portion of the rotisserie spit which extends outside of the cooking chamber.

15. The barbecue grill assembly of claim 14, wherein the rotisserie driver is a motor configured for direct engagement with the rotisserie spit.

16. The barbecue grill assembly of claim 14, wherein the connection connects the rotisserie driver to a side shelf for the barbecue grill, such that the rotisserie driver extends from and retracts into an upper working surface of the side shelf.

17. The barbecue grill assembly of claim 16, wherein at least a portion of the rotisserie driver is generally flush with the upper working surface when the driver is placed in the first position.

18. A shelf assembly for attachment to a barbecue grill comprising:
a shelf having an upper working surface;
a rotisserie motor support structure for holding a rotisserie motor, the structure including at least one pivot connection for moving the motor between a usage position and a storage position;
the rotisserie motor being positioned generally below the upper working surface when the structure is moved to the storage position; and,
the rotisserie motor being positioned above the upper working surface of the shelf when the structure is moved to the usage position.

19. The shelf assembly of claim 18, wherein the pivot connection is disposed near a rear edge of the upper working surface whereby the rotisserie motor is configured to flip behind the shelf when moved to the storage position.

20. A barbecue grill assembly comprising:
a cooking chamber having a heat source and including a support for a rotisserie spit, wherein a portion of the rotisserie spit extends outside of the cooking chamber past a sidewall of the cooking chamber, the portion of the rotisserie spit which extends outside of the cooking chamber being configured to engage with a rotisserie motor;
a side shelf being disposed adjacent to the sidewall of the cooking chamber and having an upper wall and at least one side wall;
a support apparatus for supporting the rotisserie motor, the support apparatus having a first wall and being movably connected to the side shelf assembly for movement from a first position, where the rotisserie motor is stored and where the first wall is generally flush with one of either the upper wall or the at least one side wall of the side shelf, to a second position, where the rotisserie motor is accessible for use, the support apparatus remaining connected to the side shelf assembly while moved between the first position and the second position;
the rotisserie motor being movably connected to the support apparatus, wherein the rotisserie motor is movable between a retracted position and an extended position, the rotisserie motor being aligned for engagement with the rotisserie spit in the extended position.

21. The barbecue grill assembly of claim 20 wherein the barbecue grill assembly further comprises a lock mechanism for locking the support structure in second position.

22. The barbecue grill assembly of claim 21 wherein the barbecue grill assembly further comprises a lock mechanism for locking the rotisserie motor in the retracted position.

23. The barbecue grill assembly of claim 20 wherein the barbecue grill assembly includes a first hinge for connecting the support apparatus to the side shelf, whereby the support apparatus pivots between the first and second positions.

24. The barbecue grill assembly of claim 23 wherein the first hinge is disposed near an edge of the upper wall, whereby the support apparatus is configured to flip over the edge of the shelf.

25. The barbecue grill assembly of claim 23 wherein the side shelf includes an opening in the upper surface and the first hinge interconnects the support apparatus to the side shelf at a rear of the opening, whereby the support apparatus is configured to flip down into the opening.

26. The barbecue grill assembly of claim 25 wherein the first wall includes a finger hole which is disposed at a front of the opening when the support apparatus is placed in the first position.

27. The barbecue grill assembly of claim 23 wherein the barbecue grill assembly includes a second hinge for connecting the rotisserie motor to the support apparatus, whereby the motor pivots between the refracted and extended positions.

28. The barbecue grill assembly of claim 20 wherein the support apparatus includes a second wall which is connected to and transverse to the first wall, whereby the second wall supports the motor and is collapsible for moving the motor between the storage and usage positions.

29. The barbecue grill assembly of claim 20 wherein the rotisserie motor slidably engages the support apparatus.

30. A barbecue grill assembly comprising:
a side table having an upper working surface and at least one sidewall;
a cooking chamber having a heat source and being configured to receive a rotisserie spit, wherein a portion of the rotisserie spit is configured for engagement with a rotisserie driver;
a support apparatus for supporting the rotisserie driver, the support apparatus having a hinge which is configured to attach the support apparatus to the side table near an edge of the upper working surface, the hinge allowing the support apparatus to move between a first position, where the rotisserie driver is stored, and a second position, where the rotisserie driver is positioned above a side shelf of the barbecue grill; and, wherein the support apparatus comprises a first wall which is generally flush with the sidewall of the side table when the support apparatus is placed in the first position and is generally flush with the upper working surface of the side table when the support apparatus is placed in the second position.

31. The barbecue grill assembly of claim 30 wherein the edge of the upper working surface is a rear edge.

32. A barbecue grill assembly comprising:
a cooking chamber having a heat source;
a support apparatus for supporting an electrically powered device, the support apparatus being connected to the barbecue grill assembly;
the support apparatus being configured to allow the electrically powered device to move between a first position, where the device is stored, and a second position, where the device is positioned above a side shelf of the barbecue grill, without disconnecting the device from the support apparatus or the support apparatus from the barbecue grill assembly; and,
wherein the support apparatus is movably connected to the side shelf of the barbecue grill.

33. The barbecue grill assembly of claim 32 wherein the electrically powered device is a light fixture.

34. The barbecue grill assembly of claim 33 wherein the light fixture is battery powered.

35. The barbecue grill assembly of claim 32 wherein the electrically powered device is a rotisserie motor.

36. The barbecue grill assembly of claim 32 wherein the support apparatus is pivotably attached to the side shelf.

37. The barbecue grill assembly of claim 32 wherein the support apparatus is configured to pop up out of a top working surface of the side shelf.

* * * * *